July 11, 1961 F. ALBRECHT 2,992,296
CRASH DATA RECORDER
Filed Nov. 12, 1958
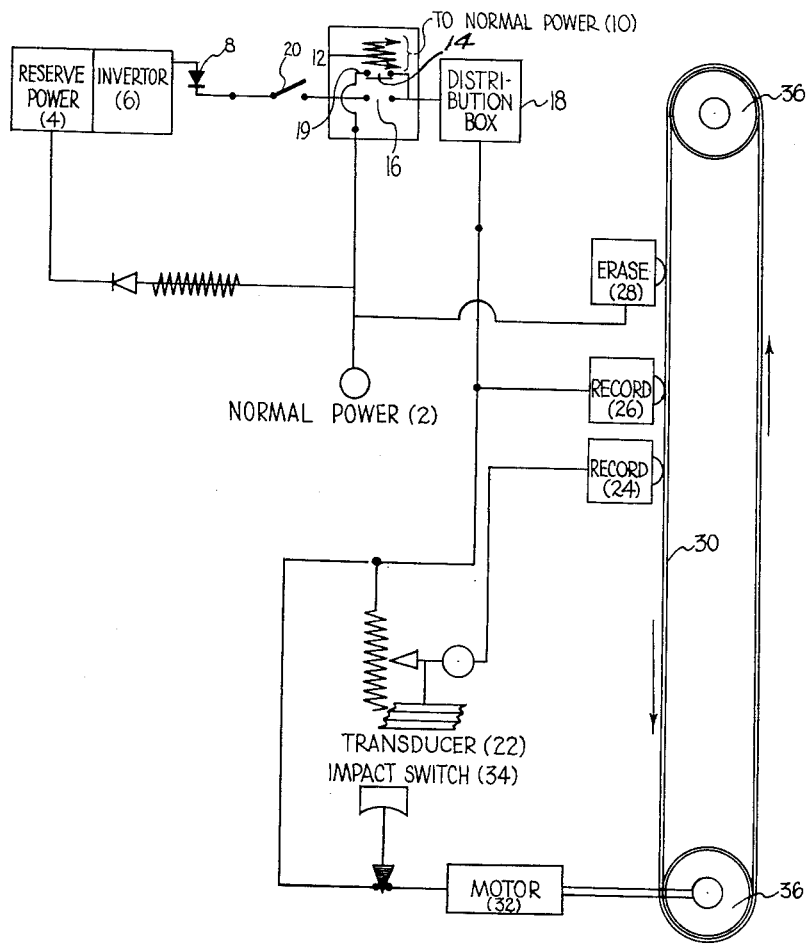
INVENTOR
FRITZ ALBRECHT
BY JOHN GIBSON SEMMES
ATTORNEY United States Patent Office 2,992,296
Patented July 11, 1961

2,992,296
CRASH DATA RECORDER
Fritz Albrecht, Rte. 1, Box 196D, Glenarm, Md.
Filed Nov. 12, 1958, Ser. No. 773,237
7 Claims. (Cl. 179—100.2)

The present invention relates to means for studying transient phenomena, particularly to a recorder which will discriminately record critical phenomena in the operation of modern aircraft and other carriers, missiles, nuclear reactors, and like power and force generating units.

The instant discriminating recorder is especially adaptable to the study of critical phenomena which transpire immediately preceding and during an airplane crash. The recorder is unique in that it embodies a reserve power system which is operable upon failure of the normal aircraft power system and the recorder includes means for sensing audio, pressure, temperature as well as electrical phenomena. Thus, in post-study of the recording, the intercommunication of aircraft personnel may be studied in relation with the various physical phenomena of the aircraft system. These capabilities permit a scientific study of airplane crashes; their causes, as well as the reactions of the crew and the performance of the aircraft during crash. At present, airplane crashes are "studied" by examination of the wreckage and extrapolation as to the probable causes of the crash.

Recording equipment seldom possesses the ability to discriminate between events worth-while recording and those which are redundant. Where critical events occur randomly, recording now must be effected continuously. This burdens the record with much unimportant data. As a result, either insufficient recording is done, resulting in lack of and poor definition of a critical event, or severe economical and physical burdens are engendered. One compromise, now practiced in power transmission and reactor control, is the commencement of recording once conditions have reached a critical point. This practice of course loses the entire history preceding criticality.

Successful solution of the above requires discriminate recording, that is, recording of all phenomena, extracting from that recording only that fraction of phenomena which precedes and transpires during a critical event, plus relation of recorded "critical" phenomena to the phenomena of normal operation. In this manner, a recorder might continuously survey a reactor operating normally and discard all normal-operation information after a time lapse. In the event of a surge, however, this abnormal operation could cause recall of preceding information in addition to continuously recording existing abnormal operation. Thus the entire and overlapping history of the surge would be recorded.

To achieve the above results, operating phenomena are translated into a frequency analog which is recorded on a tape loop. Simultaneously, as in the case of reactor control, conversation or instructions of the reactor operator might be recorded on the same tape loop. Likewise, there will be a continuous erasing of the phenomena. The erasing will be effected substantially adjacent to entry of the tape into the recorder. Information once recorded will, therefore, "live" during transit of the tape to the eraser. In operation each operating point is adapted to sense its critical level. Attainment of criticality thus causes a signal to be sent to de-energize the erase component. Inasmuch as there is a live record of the immediate past history on the tape between the recorder and the eraser, this history will be preserved. Simultaneously, the recorder will continue operation and fix the performance which now, let us assume, is in the critical stage. Thus the history of a critical event, excluding the burden of noncritical performance history, will be recorded.

Accessory circuits such as time markers, alarm circuits, and the like may also be employed in the practice of the invention. Accessory devices such as an explosion-proof or crash-proof container, and a means for transferring the recording to spare loops once the original loop is exhausted may also be employed conveniently.

As previously noted, among the more interesting adaptations is in aircraft operation routinely, to preserve precrash and crash information. As is well known, there is an alarming paucity of information from which safety extrapolation may be made. The recording of pre-crash conversations of the crew as well as transient physical phenomena in the aircraft system should provide abundant source material for detailed study and analysis of causes of aircraft failure. The inventor considers that the instant discriminating recorder has its primary application in aircraft safety; hence the ensuing specification is directed primarily to aircraft installation.

Another interesting adaptation of the recorder system lies in missile firing wherein count-down or pretakeoff phases of a missile may be studied simultaneously. According to present practice, upon firing and acceleration of the missile engine, the fuel pumps gradually increase hydraulic pressures. A deviation from predesignated rates of pressure causes a "shut down." However, it is virtually impossible to determine the cause of shutdown. By applying the discriminating recorder to missile count-down, the cause of shutdown may be immediately determined and located by study of the recording tape.

Accordingly, an object of invention is to provide a discriminating recorder which will enable the study of critical phenomena attending nuclear reaction, aircraft operation and missile firing.

Another object of invention is to provide in a recording system having a continuous erasing instant, means for de-energization of said erasing instant upon occurrence of critical phenomena.

Another object of invention is to provide a discriminating recording system having a reserve power system which renders the recorder independent of the system being studied.

Another object of invention is to provide a discriminating recorder for the study of pre-crash crew intercommunication and physical operating phenomena and having an impact-disabled recording medium driving means.

Another object of invention is to provide a discriminating recorder for the study of transient phenomena, including the input voltage of the recorder power system.

Yet another object of invention is to provide a discriminating recorder for the study of pre-crash phenomena a reserve power system which is automatically sensitive to the failure of the normal aircraft power.

Yet additional objects of invention will become apparent from the ensuing specification and attached drawings, wherein:

The drawing is a schematic drawing illustrating the invention.

According to the drawing, normal electrical power of the aircraft is fed through an undervoltage switch, generally designated as 10, and into a distribution box 18. From the distribution box 18 normal power is fed simultaneously into voltage recording means 26 and transducer 22. From transducer 22 power is fed into audio recording means 24. The recording medium or tape 30 is driven continuously by driving motor 32, the tape revolving and moving in the direction of the arrows around reels 36. In completion of its circuits, tape 30 passes erasing means 28 which operates continuously, as long as normal power is effective. Upon cutoff or failure of normal power the erasing means is cut off. The length of magnetic tape 30 is such that, for example, there may be five minutes of recordable tape from audio recording means 24 until erasing means 28.

The tape driving motor 32 is provided with impact switch 34 which disables motor 32 upon the imposition of a predetermined degree of acceleration. Thus, recording and erasing are stopped at the moment of aircraft crash and a record of pre-crash phenomena is preserved on that portion of the tape between audio recording means 24 and erasing means 28. Manifestly, a tape circuit of greater than five minutes may be effectively employed.

The reserve power system comprises a storage battery 4 with long shelf life, a transistorized inverter 6 and rectifier 8 which prevents battery 4 from discharging into a dead system. As will be apparent, battery 4 is charged by the normal power system. Intermediate the reserve power system and the normal power system is hangar or idle switch 20 which permits cutting off of reserve power when the aircraft is transferred to "ground power" or is normally shutdown for hangaring purposes. Hangar switch 20 may be operated manually by the aircraft crew upon checklist instruction. More reliably switch 20 might be activated by low air speed, high landing gear pressure, no engine r.p.m. or a combination of these phenomena.

Undervoltage switch 10 comprises a mechanically operated solenoid 12 which is motivated by normal power to close normal power contacts 14 but upon failure of normal power switch 10 is motivated independently (i.e. mechanically) to open normal power contacts 14 and close emergency power switch 16. This independent capability of undervoltage switch 10 permits a continuation of recording independently of power failure, for as indicated, transistorized inverter 6 furnishes reserve power within $\frac{1}{10}$ second after closing of emergency switch 16.

As illustrated, a calibration connection may lead directly from distribution box 18 into voltage recording means 26 to permit "reading" of the recording in terms of the power supply voltage.

An undervoltage switch is generically a device which initiates action upon the change of voltage from one level to a different one. Specifically, an undervoltage switch will maintain one set of contacts closed at a certain voltage and when said voltage falls beneath the critical level will shift the contact mechanism so that another contact is made. The undervoltage switch will maintain this latter contact until the voltage again reaches the critical level or some higher level. In the present application undervoltage switch 10 will transfer at a predetermined voltage the contact bar shown at 19 from its shown position to the open contacts shown at 16. The transfer will occur during electrical disturbances usually attendant upon pre-crash conditions. The presence of undervoltage switch 10 is mandatory to insure a smooth power supply to the recording elements 24 and 26 which generally are voltage-sensitive. Without such instantaneously available reserve power accurate recording would be impaired or completely impossible under pre-crash conditions, involving engine failures, fires, electrical failures and structural failures, i.e. the majority of crash causes. Undervoltage switch 10 need not be of the type illustrated and the drawing should not be construed to exclude other types. The undervoltage switch shown merely serves to illustrate the concept that reserve power is instantaneously available, and necessary as an improvement over conventional recorder systems.

The reserve power system consists essentially of a charging system, a sensing system, and a transfer system. It must fulfill it mission without being disturbed in its function by pre-crash or crash conditions. Undervoltage switch 10 shown is normally held in the position shown by the voltage of normal power 2. Failure of normal power 2 releases the contacts and a spring transfers the contacts without power supply from any other source. This illustrates the "crash-condition free" action of the undervoltage switch 10.

The function of the diode and resistor adjacent to normal power supply 2 is to:

(1) Facilitate charging of reserve power 4. Normally the ship, plane or missile's batteries range from $1.32$ to $1.55a$, where $a$ is a number of cells making up the battery, so that $1.32a$ is the lower service voltage of the system while $1.55a$ is the upper service rating voltage. In conventional 28 v. systems there would be a battery of 18 cells. Thus in normal service the battery will be on a constant potential charge. The lower limit of a plane's conventional 28 v. system is variously specified. Military craft assume 25 volts, which is substantially above the cells' total normal full charge voltage of about 1.32 v. per cell. Thus, the system insures that under normal flight conditions the battery will be fully charged. If the battery were seriously depleted, the voltage may be as low as 1 volt, thus presenting a differential of 10 volts between battery and normal supply. This may cause extreme currents, therefore, the necessity for inclusion of a resistor of, say 2 ohms to limit the current to 5 amperes. Modern types of storage batteries, for example "nicad," "Silcel" etc. may remain 1.55 v. (constant voltage) without harm.

(2) Prevent the flow of current to a "dead" system. If the emergency condition is accompanied by low voltage, the emergency system "cuts in" the supply power to the recorder. By the same definition of "emergency," i.e. low normal voltage, the voltage then would be in the "normal" supply than on the battery. This would cause a wasteful flow of power to the plane's system which could easily lead to a destructive drain on the battery and, in addition, prevent proper feeding of the recorder. The waste is prevented by the unilateral characteristic of the diode which prevents all current flow. Thus, there might be utilized a modern germanium diode with a loss of only 2% or less in the "forward" (battery charging) direction, and a resistance in excess of 50,000 ohms in the reverse direction. Thus even with the normal supply completely shorted out, as well may be the case, the loss to the normal supply system, i.e. the waste, would be in the order of 7 microwatts.

Generically, a "transducer" is any device which converts a mechanical stimulus into an electrical response at a known conversion rate. Thus, transducer 22 is not considered as limited to air pressure, but may be any one of the presently available types, converting structural stress by way of strain gauges into an electrical analog, e.g. air-pressure, pitot pressure, manifold pressure and the like, by means of a collapsible bellows operating a potentiometer to modulate a current which is then the electrical analog of the originating phenomena, or the transducer may be a microphone picking up crew remarks, contacts with surface stations, etc. In this manner, on conventional tapes having a width of three inches, up to 24 phenomena can be recorded.

The weight of the discriminating voltage system as applied to aircraft has been estimated at two pounds for battery 4, four pounds for inverter 6, five pounds for the distribution box 18, undervoltage switch 10 and transducer 22, three pounds for recording means 24, 26 and erase means 28, and five pounds for the crash proof enclosure. Total estimated weight might approximate 19 pounds exclusive of pickups and wiring installation.

The instant discriminating recorder is not designed to supplement telemetering in aircraft operation. It does not supplant but supplements telemetering, for it is intended to be carried by non-telemetered aircraft, commercial and military, where continuous storage of data during normal flights constitutes a nuisance and pre-crash information is vitally important. The minimum number of recording instant has been illustrated, whereas the maximum potential is unlimited. Magnetic tape has been used as an illustration of the recording medium although other memory systems may be equally effectively employed. The types of pickups and recording heads single or multiple are dictated by the band or bands width required for specific applications and may vary considerably. The type of data may be timed, and these include: time interval, altitude, craft altitude, pressures, r.p.m. acceleration, cockpit conversation, and intercommunication of crew, the phenomena to be recorded being unlimited in scope. Selectivity thereof will be dictated by experienced safety officers as in the case of aircraft or launching chief as in the instance of missile control.

Manifestly, the foregoing is a description of a preferred embodiment of invention, the same applying to aircraft operation, but this is not to be taken as a limitation thereto, since numerous modifications thereof may be employed without departing from the spirit and scope of invention claimed below.

I claim:

1. A recorder having means for sensing transient operating phenomena of generating units, including a normal power source and a reserve power source, an endless recording medium comprising a belt rotatably mounted adjacent a recording head, independent means positioned between said reserve and normal power sources as a bridge between said reserve power source and said recording medium upon failure of said normal power source, and an erasing means activated by said normal power source only and positioned adjacent said endless recording medium.

2. A recorder as in claim 1, including means for recording input voltage of said power sources.

3. A monitoring device for use in airplanes and the like including a discriminating recorder having audio, pressure, temperature, as well as electric sensing means, and a continuous recording medium linked to said sensing means for recording sensed phenomena, an erasing means positioned adjacent said recording medium, said recording medium being activated by a normal aircraft power source, an independent reserve power source, means responsive to failure of aircraft power to actuate said reserve power source, and an impact cut-off switch effective upon aircraft crash to cut-off both said power sources.

4. A recorder for use in monitoring engine and engine operator performance comprising a normal power source and an independent reserve power source; operator speech and engine performance sensing means linked to a continuous recording medium which records sensed phenomena; independent means positioned between said reserve and normal power sources as a bridge between said reserve power sources and said recording medium upon failure of said normal power source; an impact responsive cut-off means affixed to said normal and reserve power sources for cutting off said sources; and a recording medium erasing means positioned adjacent said recording medium and activated by said normal power source only, said erasing means continuously erasing recorded data except upon failure of said normal power source.

5. A discriminating recorder for use in monitoring airplane and airplane operator performance comprising means for sensing-recording airplane operator speech and airplane system performance, a continuous recording medium, an impact disabled recording medium driving means, a recorder normal power source, a recorder reserve power source; independent means positioned between said reserve and normal power sources as a bridge between said reserve power source and said recording medium upon failure of said normal power source; and a recording medium erasing means connected to said normal power source only, said erasing means being disabled upon failure of said normal power system.

6. A discriminating recorder as in claim 5, said reserve power source comprising a storage battery, a transistorized inverter and a rectifier connected to said normal source by means of an undervoltage switch independently operable to engage said reserve power upon failure of said normal power.

7. A discriminating recorder as in claim 6, including distributor and transducing means interconnecting said power sources and said means for sensing-recording.

References Cited in the file of this patent

UNITED STATES PATENTS

| | | |
|---|---|---|
| 2,046,976 | Sorensen | July 7, 1936 |
| 2,380,392 | Begun | July 31, 1945 |
| 2,583,983 | Arndt et al. | Jan. 29, 1952 |
| 2,726,075 | Hosford | Dec. 6, 1955 |
| 2,830,194 | Bembenek | Apr. 8, 1958 |
| 2,838,360 | Foster | June 10, 1958 |
| 2,873,073 | Lekas | Feb. 10, 1959 |